March 2, 1937.                W. F. OCENASEK                2,072,646
              DRILL PRESS SPINDLE DRIVE AND MOUNTING
                     Filed Oct. 23, 1935            2 Sheets-Sheet 1
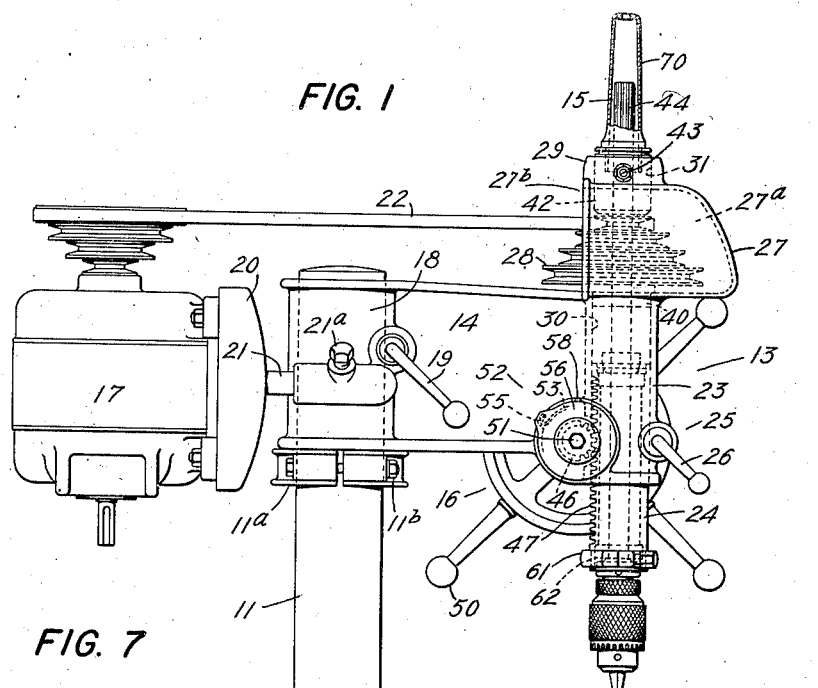
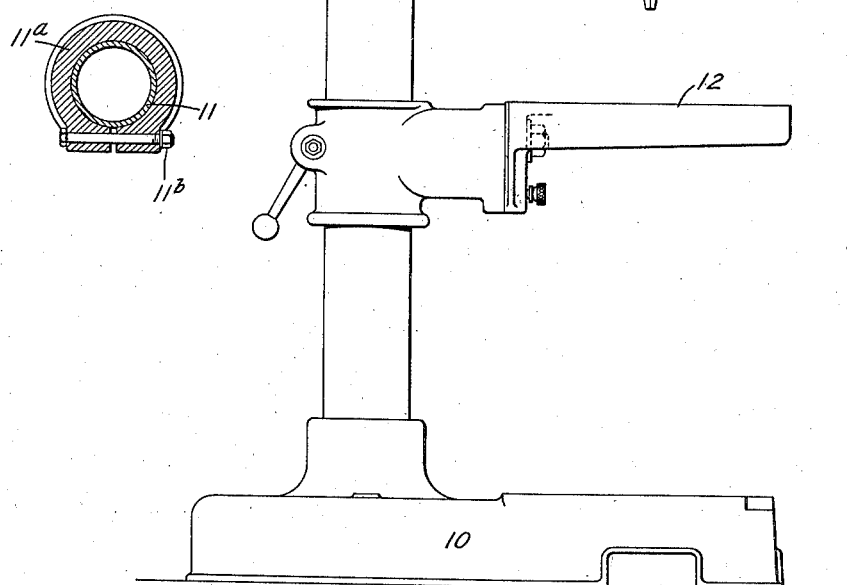
INVENTOR
William Ferdinand Ocenasek
BY
Albert F. Nathan
ATTORNEY March 2, 1937.　　W. F. OCENASEK　　2,072,646
DRILL PRESS SPINDLE DRIVE AND MOUNTING
Filed Oct. 23, 1935　　2 Sheets-Sheet 2
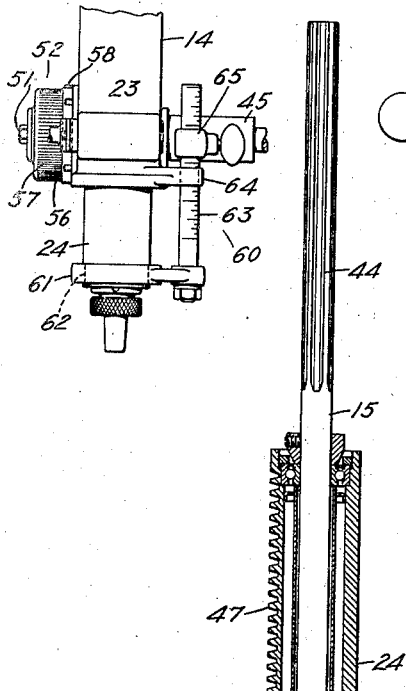
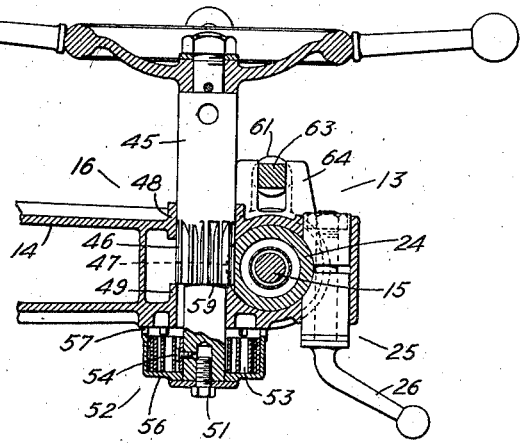
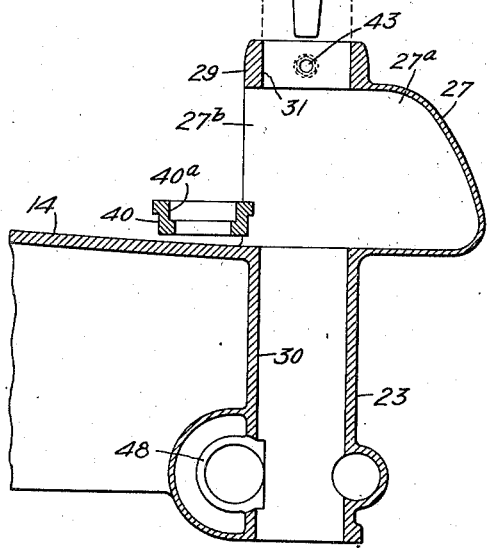
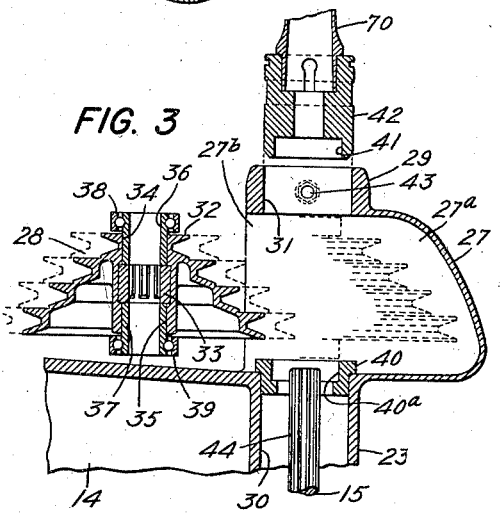
INVENTOR
William Ferdinand Ocenasek
BY
Albert F. Nathan
ATTORNEY Patented Mar. 2, 1937

2,072,646

UNITED STATES PATENT OFFICE 2,072,646

DRILL PRESS SPINDLE DRIVE AND MOUNTING

William Ferdinand Ocenasek, Plainfield, N. J., assignor to Walker-Turner Company, Inc., Plainfield, N. J., a corporation of New York Application October 23, 1935, Serial No. 46,255

9 Claims. (Cl. 77—6)

The present invention relates to drilling machines and more particularly to the mounting and driving of the spindle mechanisms of such machines.

The invention has for its general objects to render available a drilling machine, constructed on the unit principle, which may be easily and inexpensively manufactured and assembled and which affords a convenient means for changing the range of available spindle speeds without sacrificing rigidity or accuracy in the performance of the drilling operations or materially increasing the number of parts required in the complete assembly.

Heretofore, drilling machines of the upright type have been made and assembled part by part and piece by piece until the machine was completed, and this was largely due to the fact that each bearing, each part etc. was machined to various particular sizes and the assembling the individual parts necessarily had to follow a prescribed order. From a manufacturing standpoint the machines were expensive to construct because of the multiplicity of different machining operations required for each fitting and the difficulty in accurately aligning the numerous spaced elements.

Another disadvantage found in the prior upright machines is that they could not be converted from a low speed machine (as for metal working) to a high speed machine (for wood working), and it was necessary, therefore, for a user to have two or more machines, one for each class of work. In addition, the ultimate spindle drive pulley in such machines, was usually supported upon a single bearing, so that an endless belt could be slipped over the unsupported end thereof, which resulted in a construction having considerable undesirable overhang conducive to severe vibration and consequent error and runout of the spindle nose. In other constructions, the spindle pulley was permanently journaled in bearings supported by fixed portions passing through the belt at the motor side of the spindle and likewise afforded no possibility of converstion while at the same time resulting in a construction dangerous to use because of the open, unguarded condition of the belt drive which normally is at or about the head level of the operator.

The present invention aims to overcome the disadvantages found in the prior constructions and has for a further object to devise a drilling machine in which a single housing is employed, and enclose therein all of the moving and operating parts of the drill press, such as the translatable and rotatable spindle, the spindle driving means and the spindle feeding means, in a manner permitting the convenient and inexpensive machining and subsequent assembling of the various parts. Manufacturing problems have been further simplified by a construction wherein the head casting affords upper and lower bearings or supports for the spindle rotating element as well as supporting and guiding surfaces for the spindle sleeve at the lower portion of the spindle. Both sets of surfaces being of equal size, all may be machined in a single operation assuring perfect accuracy in alignment. The spindle and spindle sleeve may therefore be pre-assembled and inserted into the head casting as a unit from either end of the aligned apertures, and likewise subsequently removed from either end.

A further aim of the invention is to provide a construction in which ample support is given to both sides of the ultimate spindle rotating element, while at the same time, allowing for the quick and easy removal thereof for the purpose of changing the speed characteristics of the machine or for the replacement of a cooperating driving instrumentality, such as, for example an endless belt. With that end in view the ultimate drive element for rotating the spindle is also constructed as a unitary assembly and arranged to be inserted or removed laterally through a lateral opening in the head casting. Conveniently located and easily operated means are provided for removably journaling the spindle driving assembly in the main casting in axial alignment with the spindle in a manner such that the lateral thrusts incident to propelling the driver are divided between two bearings and transmitted directly to the main frame and not to the spindle itself. The present arrangement eliminates all overhang of the driver while at the same time affords a construction whereby the spindle may be lowered out of its driving assembly, the latter quickly detached from the machine frame, moved laterally through the opening in the side of the housing and another assembly of a different size replaced in the machine organization.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 1 of the drawings is an assembly view of a drilling machine incorporating this invention.

Figures 2 and 3 are diagrammatic figures illustrating the relation of the parts on assembling.

Figure 4 is a sectional view through the spindle feed mechanism and counterbalance mechanism.

Figure 5 is a view of the counterbalance unit, illustrating more clearly a preferred manner of assembling same.

Figure 6 is a fragmentary view illustrating the positive stop and depth gauge mechanism.

Figure 7 is a sectional view of the head supporting thrust ring.

The machine illustrated in Figure 1 of the drawings comprises essentially a base member 10, an upright cylindrical post 11 upon which an auxiliary table 12 and a tool head 13 are mounted for vertical and angular adjustment.

The head 13 includes a main casting 14 which supports the spindle 15, manual feed mechanism 16, and spindle drive motor 17, all of which are mounted as a unit whereby vertical and angular adjustment on the post 11 may be accomplished without destroying the relation between the drive motor and spindle.

The means for mounting the head upon the column includes a girdle portion 18 formed integral with the head bracket 14 and which encircles the post 11. Clamping means 19 is provided operative to clamp the girdle to the post in a predetermined elevated or angularly adjusted position.

The drive motor 17 is mounted upon a motor bracket 20 and adjustable toward or away from the axis of the spindle 15 by means of oppositely disposed rods 21 slidable in the head bracket 14. The motor mounting, in this instance, tends to counterbalance the overhang of the spindle on the opposite side of the drill column 11, and the slidable mounting and clamp means 21a therefor affords a convenient means for adjusting the tension of the drive belt 22.

The drill column is also provided with a thrust ring 11a which may be clamped to the column by the screws 11b in a particular position under the head and the head bracket lowered thereon and supported thereby. With the girdle clamp 19 slightly loosened, the spindle 15 may be swung angularly about the column upon the thrust ring 11a without, however, disturbing its position vertically upon the column. This arrangement is particularly useful when adjusting the head on the column and when it is desired to swing the head out of the way in setting up a workpiece or when it is desired to drill a piece mounted outside of the table.

The forward portion of the head bracket is enlarged to provide a sleeve girdle 23 to accommodate the spindle sleeve 24 which surrounds the lower portion of the spindle 15. The lower front portion of the sleeve girdle is provided with clamp means indicated at 25 operable by a sleeve clamp lever 26 whereby the sleeve may be clamped in a predetermined vertical position, as for example, when using the machine as a router, or when by inverting the head on the column the machine is used as a shaper.

Above the sleeve girdle portion 23, the head bracket 14 is further enlarged at 27 to provide an aperture 27a for a spindle rotating pulley 28, then reduces in size above the pulley to substantially that of the girdle portion 23, thereby providing an outboard support 29 for the outer end of the driver 28. It will be observed that the support 29 for the outer end of the driver is formed integral with the sleeve girdling portion of the head bracket by extending the front and sides of the sleeve girdle upward and around the drive pulley. This affords a construction in which all of the moving parts are enclosed and a construction in which firm support is given to the outer end of the spindle rotator and accuracy in alignment of the parts consistently maintained.

The inner surface 30 of the sleeve girdling portion of the bracket is bored and reamed accurately to fit the translatable sleeve 24, and these machining operations are carried all the way through the outer support 29 so that the inner surface 31 thereof is equal in size to, and in coaxial alignment with, the sleeve bore 30. Accordingly, the spindle assembly may be inserted or removed from either end of the head casting as illustrated in Figures 2 and 3.

A further feature of the invention concerns the mounting of the spindle driver 28 in the frame 14 in a manner permitting easy access for changing its size or for changing or applying a new belt, while at the same time providing a construction wherein the lateral forces incident to the driving action are transmitted directly to the machine frame and not to the sliding spindle 15.

Referring to Figure 3 of the drawings the driver 28 there illustrated in full lines, comprises a four-step pulley member 32 die cast around a centrally disposed and internally splined sleeve element 33. Locating upon the splined member 33, the peripheries of the stepped pulley and the central bores 34 and 35 are thereafter turned true. Short splineless sleeve members 36 and 37 which carry at their outer ends antifriction bearings 38 and 39 are then forced into the bores 34 and 35.

The driving assembly thus provided, seats at its lower end in a stepped bushing 40 which has a relatively tight fit into the upper end of the sleeve bore 30. The upper end of the rotating assembly, i. e. the outer race of the bearing 38, seats in a recess 41 formed in a removable bushing 42, which recess is below the plane of the support 29 for a purpose presently to appear. Normally, clamp means 43 maintains the bushing in its proper adjusted position within the bore 31 of the outboard support 29.

At the rear of the enlarged portion 27 of the frame, a lateral opening 27b is provided of a size sufficient to permit the lateral movement of the rotating assembly 28 therethrough. To remove the assembly the bushing 42 is moved outward along the shaft 15 until the rotating assembly may be lifted out of the pocket 40a in the lower bushing. The spindle is then lowered a distance sufficient to permit the rotating assembly to be moved across the end thereof in its lateral movement through the rear opening 27b. It will be noted that the splines 44, which coact with the splines of the element 33 in the driving assembly, pass all the way to the end of the spindle shaft and facilitate this operation. A guard member 70 normally encloses the end of the spindle.

The vertical alignment of the spindle is maintained at all times by the spindle sleeve 24 and bore 30 of the main frame and the lateral pull of the belt 22 does not effect spindle alignment in any way. The outer supporting bushing 42, as well as the splineless sleeves 36 and 37, is peripherally spaced slightly from the spindle to further insure that the pull of the belt 22 does not kant the spindle or cause any run out at the lower end.

The feeding mechanism for the spindle indicated generally by the character 16, includes a pinion shaft 45, having pinion teeth 46 cut thereon and adapted to mesh with the rack teeth 47 cut upon one side of the spindle sleeve 24. The pinion shaft 45 is journaled in bearings 48 and 49 provided by the head casting 14, and projects through one side thereof to provide a mounting for an operating pilot wheel 50. The depth of cut to be taken by the tool carried at the end of the spindle may be controlled by a direct reading indicating and positive stop mechanism 60 removably clamped to the spindle sleeve 24. The mechanism comprises a gauge supporting ring 61, adapted to be clamped to a slightly relieved portion 62 of the spindle sleeve, and a graduated bar 63 carried thereby. The graduated member 63 extends through an opensided slot provided between two guide abutments 64 that project from the side of the main frame 14. The bar 63 carries an adjustable stop 65, operative when clamped to the bar in a predetermined position, to engage the upper surfaces of the abutment 64 and thus positively limit the downward movement of the spindle to the desired amount. The abutment 64 it will be noted, also serve as a guide means which in addition to the pinion 46, restrainr the spindle sleeve 24 against turning.

The other end of the pinion shaft is reduced and threaded to receive a holding screw 51 which is employed to hold a spindle counterbalance mechanism 52 and the pinion shaft 45 in their proper positions. The counterbalance mechanism includes a spiral spring 53, one end of which is key-holed to fit over a headed stud 54 radially positioned in the pinion shaft 45, and the other end of which by means of a reversely curved portion 55 interlocks with a counterbalance housing 56. The housing 56 completely encloses the spring 53 and has formed therein a plurality of peripheral notches 57 adapted selectively to interlock with a rib 58 upon the head casting 14. The casting 56 has a knurled outer periphery to afford a good purchase for the operator and being of a one piece construction having a continuous outer surface it is exceptionally strong and easy to operate since there are no sharp corners of the spring projecting which might cause an injury.

By removing the screw 51 a short distance, the housing 56 may be disengaged from the rib 58 and turned counterclockwise to increase the tension of the spring whereby the latter may function not only as a spindle counterbalance but as a spindle retracting means as well. When the screw 51 is removed entirely the counterbalance means 52 may be rotated clockwise to fully unload the spring, which automatically disengages itself from the pin 54 in the pinion shaft, and the unit lifted off of the pinion shaft 45. The latter is then free to be shifted laterally in the direction of the pilot wheel thereby to disengage the pinion 46 from the rack teeth 47 of the spindle sleeve whereupon the spindle assembly may be lowered entirely out of the head casting, whenever desired, or only so far as necessary to allow the drive assembly 28 to be shifted laterally over the top end thereof.

Upon assembling, a drive assembly 28 having a preselected range of speed ratios for the particular operation, is moved into the lateral opening in the main casing and properly seated in the bushing 40 and the movable bushing 42. The spindle assembly is then elevated until the rack teeth 47 line up with the teeth of the pinion 46 and the latter is moved in until the shoulder 59 engages the end face of the journal bearing 49. The counterbalance unit is then applied over the end of the pinion shaft wound up and locked by the screw 51, and the entire assembly is ready for operation.

Owing to the relatively short distance between the spindle axis and motor axis it is expedient to use a V belt and V pulleys and as such drives are more efficient when a one piece belt is employed, the present arrangement of parts lend themselves eminently suitable to that type of drive by virtue of the ease in which continuous belts may be replaced, even though the spindle driver normally is substantially entirely enclosed and firmly supported in bearings located at each side of the plane of the pulley and belt.

From the foregoing it will be perceived that drilling machines embodying the principles of the invention may be constructed and pre-assembled in units which may thereafter be assembled in a quick and easy manner, and a machine when assembled provides long sturdy guides for the spindle, a two point journal mounting for the spindle driver and an organization possessing the flexibility and versatility necessary to adapt the machine to a relatively high or relatively low range of spindle speeds depending upon the type of operation to be performed by the machine.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be comprehended within the meaning and range of equivalency of the following claims.

Having thus revealed this invention, I claim as new and desire to secure the following combinations and elements, or equivalents thereof, by Letters Patent of the United States:

1. A drilling machine combining an upright cylindrical column member of uniform diameter throughout its length; a vertically adjustable head member having a portion girdling said column and other diametrically opposite portions projecting radially from the column; one of said portions comprising a spindle guide bracket providing a substantially closed housing and integrally formed upper and lower bearing portions, said housing having an opening therein at the side thereof facing said column, a drill spindle mounted in said bracket in axial alignment with the axes of said bearing portions; a spindle driving pulley assembly journaled in said housing in said upper and lower bearing portions thereof; driving means for said spindle comprising an electric motor mounted upon a vertical axis on said other portion of said bracket, a driving pulley thereon, and an endless belt connection between said driving pulley and the spindle driving pulley, the axes of said spindle, column, and motor lying in the same plane so that the said driving belt passes on opposite sides of the column; means for clamping said head in an adjusted position on the column; and means removably mounted in said upper bearing portion affording journal bearing means for the spindle driving pulley operable upon removal to render said spindle driving pulley freely movable laterally through the opening in the side thereof facing the column.

2. A drilling machine combining a spindle guide bracket; a rotatable and translatable spindle journaled therein, said bracket having an expanded portion at its upper end providing a substantially closed housing for a spindle drive pulley assembly and spaced upper and lower supporting means therefor; a spindle drive pulley assembly insertable in said housing; said expanded portion being provided with an unobstructed opening in its rear wall to accommodate both strands of a belt for driving the said pulley and being of a size adapted to allow bodily movement of said drive pulley laterally therethrough; said assembly including a pulley and bearing means at each side thereof; a floating connecting means between said assembly and said spindle; a supporting bushing for the lower bearing means of said assembly insertable in said lower supporting means of the housing; and a bushing removably mounted in said upper supporting means of the housing providing an upper support for the other bearing means of said assembly operable upon removal to render said driving assembly freely movable laterally through the lateral opening in said housing.

3. A drilling machine combining a spindle housing having an expanded portion at one end closed at its front and both sides; a rotatable and translatable spindle journaled in the housing; a driving assembly substantially enclosed within the expanded portion of said housing for rotating said spindle; said expanded portion of the housing being provided with an unobstructed aperture larger than said assembly in the rear lateral wall thereof adjacent the normal position of said driving assembly; means removably journaling said assembly in said housing at opposite sides of said lateral opening comprising a pair of relatively movable spaced bushings removably fitted to said housing at opposite sides of the expanded portion and concentrically arranged with said spindle adapted normally to support end portions of said assembly within said substantially closed housing at opposite sides of its plane of rotation; clamp means for maintaining said bushings in assembly supporting relation operative upon unclamping to render one of said bushings movable axially of the spindle and thereafter lateral displacement of said assembly through said lateral opening upon the translation of said spindle out of said assembly.

4. A drilling machine combining a frame member having an expanded housing portion closed at its front and both sides and open at the rear side; a rotatable and axially movable spindle having its lower portion guided and supported in the said frame; a spindle rotating assembly removably journaled in the said expanded portion of said frame and adapted to connect directly to said spindle for rotating same, said assembly being substantially enclosed by said housing portion, and said portion having an unobstructed opening therein at the rear opposite the normal position of said assembly for insertion of said assembly laterally therethrough; means operable through said opening for driving said assembly; means above and below the lateral opening in the expanded portion of said frame and supported thereby for journaling and supporting said assembly in a predetermined position therein; and means for removing one of said assembly supporting means to allow lateral insertion or removal of the assembly through the said opening in the rear side of said expanded portion.

5. A drilling machine combining a substantially closed housing; a rotatable and translatable spindle journaled therein; said housing having an expanded portion near one end and having aligned apertures of equal size therein and disposed one above the other in spaced relation, the lower aperture affording bearing surfaces for guiding and supporting said spindle; a spindle rotating assembly located in said expanded portion of the housing between the adjacent end portions of said spaced surfaces and having a sliding driving connection with said spindle; said expanded portion of the housing being completely closed on three sides whereby rigid support is given to said upper portion and having an opening provided in the rear wall adjacent the normal position of the said spindle drive assembly, for receiving said assembly; a lower detachable journal bearing means for said assembly; and means removably mounted in said upper aperture and affording upper journal bearing means for said assembly operable upon removal to render said driving assembly freely movable laterally through the said rear opening in said housing and upon removal of said lower journal bearing means to render said spindle freely movable through said upper aperture in the housing.

6. A drilling machine combining a vertically arranged reciprocable tool spindle; a substantially closed head bracket for supporting said spindle, said bracket having integrally formed portions providing upper and lower spaced apertures of equal size in axial alignment for receiving the spindle, said portions being connected by an expanded portion of said bracket substantially enclosing the space intermediate said upper and lower apertures; a spindle sleeve surrounding the lower portions of said spindle and adapted to be guided and supported throughout its normal operating range of movement by the walls of the lower aperture provided in said bracket; means for moving said sleeve through the upper aperture provided in said bracket; said expanded portion of said bracket being also provided with an unobstructed opening in a rear wall thereof intermediate said upper and lower integral portions; drive means laterally insertable through said rear opening between adjacent end faces of said spaced apertures and operatively connectible with the upper end portion of said spindle for rotating same; and means insertable in said upper and lower apertures for detachably journaling said drive means in said bracket.

7. A drilling machine combining an axially movable splined spindle shaft; a head frame; means for supporting and guiding said shaft in said frame; said frame having an expanded portion near one end; a spindle rotating assembly journaled in the expanded portion of said frame having a splined connection with said shaft for rotating said shaft; means removably mounting said assembly in said frame comprising bushing members removably fitted to recesses provided in supporting portions of said frame at each side of the said expanded portion; said supporting portions having opposed faces spaced from each other a distance greater than the axial length of said spindle rotating assembly to allow displacement of said assembly in a lateral direction therebetween upon the removal of one of said bushing members; and means normally maintaining said bushing members in a predetermined position relative to said assembly in said frame.

8. A convertible drilling machine adapted to be equipped with one of a plurality of spindle rotating assemblies, each assembly affording a different range of spindle speeds and each having inner and outer bearing portions of a uniform size, combining a tool spindle; a head bracket for supporting and substantially enclosing said spindle, said bracket having integrally formed expanded portions with spaced apertures therein in axial alignment for receiving the tool spindle, said expanded portion also having an opening in the rear wall thereof slightly larger than the largest of said assemblies; means common to all spindle driving assemblies insertable in the said spaced apertures for removably journaling a preselected spindle driving assembly in the expanded portion of said bracket; means establishing a driving connection between said spindle and the inserted driving assembly; and drive means operable through the opening in the rear wall of the expanded portion for driving said assembly.

9. A drilling machine combining a reciprocable tool spindle assembly, comprising a spindle shaft proper and a sleeve member surrounding the lower portion of said shaft; a bracket member for supporting said sleeve and spindle shaft and substantially enclosing same on three sides, said bracket being provided with integrally formed upper and lower spaced portions providing apertures in axial alignment for receiving said spindle assembly, said lower aperture having side walls adapted to support and guide the sleeve member of the spindle assembly throughout its normal range of travel; a spindle drive pulley assembly journaled in said bracket intermediate said spaced portions, said bracket member being also provided with an opening in its rear wall intermediate said spaced portions for receiving a cooperating drive belt and being of a size to accommodate the lateral passage of said spindle driving assembly therethrough; and means insertable in the apertures provided in said spaced portions of the bracket for supporting said drive pulley assembly therein at both sides of its plane of rotation.

WILLIAM FERDINAND OCENASEK.